(12) United States Patent
Yoshida et al.

(10) Patent No.: US 11,635,147 B2
(45) Date of Patent: Apr. 25, 2023

(54) SEAL RING

(71) Applicant: NOK CORPORATION, Tokyo (JP)

(72) Inventors: Yusuke Yoshida, Fukushima (JP); Koji Watanabe, Fukushima (JP)

(73) Assignee: NOK CORPORATION, Tokyo (JP)

( * ) Notice: Subject to any disclaimer, the term of this patent is extended or adjusted under 35 U.S.C. 154(b) by 123 days.

(21) Appl. No.: 16/896,316

(22) Filed: Jun. 9, 2020

(65) Prior Publication Data

US 2020/0300370 A1 Sep. 24, 2020

Related U.S. Application Data (63) Continuation of application No. PCT/JP2019/003000, filed on Jan. 29, 2019.

(30) Foreign Application Priority Data

Feb. 8, 2018 (JP) .............................. JP2018-020955

(51) Int. Cl.
*F16J 15/44* (2006.01)
*F16J 15/16* (2006.01)
*F16J 15/3272* (2016.01)

(52) U.S. Cl.
CPC ........... *F16J 15/441* (2013.01); *F16J 15/164* (2013.01); *F16J 15/3272* (2013.01)

(58) Field of Classification Search
CPC ....... F16J 15/441; F16J 15/164; F16J 15/3272
See application file for complete search history.

(56) References Cited

U.S. PATENT DOCUMENTS 5,169,162 A  12/1992  Azami et al.
5,722,665 A *  3/1998  Sedy ................... F16J 15/3412
                                                    277/400

(Continued)

FOREIGN PATENT DOCUMENTS

CN  101657661 A  2/2010
CN  104114916    10/2014

(Continued)

OTHER PUBLICATIONS

First Office Action dated Sep. 17, 2021 in corresponding KR application No. 10-2020-7015216.

(Continued)

*Primary Examiner* — Eugene G Byrd
*Assistant Examiner* — L. Susmitha Koneru
(74) *Attorney, Agent, or Firm* — Greenblum & Bernstein, P.L.C.

(57) ABSTRACT

The seal ring is annular around an axis x and includes an annular outer peripheral surface facing an outer periphery side, and a plurality of recessed parts. The recessed parts are formed in such a way as to be spaced apart from each other in a circumferential direction and are recessed from the outer peripheral surface toward an inner periphery side. The recessed parts expand, in the axis x direction, from one side surface to a position which does not reach another side surface. The outer peripheral surface includes a annular contact surface between the another side surface and the position, and rib surfaces respectively between mutually neighboring recessed parts in the circumferential direction. Each of the rib surfaces extends between the one side surface and the position in the axis x direction.

5 Claims, 11 Drawing Sheets

(56) References Cited

U.S. PATENT DOCUMENTS

| | | |
|---|---|---|
| 10,359,114 B2* | 7/2019 | Seki .................. F16J 15/441 |
| D875,900 S * | 2/2020 | Yoshida .................. D23/269 |
| 2010/0133757 A1 | 6/2010 | Maeda et al. |
| 2012/0018957 A1 | 1/2012 | Watanabe |
| 2013/0026714 A1 | 1/2013 | Maeda et al. |
| 2015/0048574 A1* | 2/2015 | Seki .................. F16J 15/181 |
| | | 277/589 |
| 2015/0108720 A1 | 4/2015 | Seki et al. |
| 2015/0204204 A1 | 7/2015 | Seki et al. |
| 2015/0362074 A1 | 12/2015 | Seki et al. |
| 2016/0116066 A1 | 4/2016 | Watanabe et al. |
| 2017/0009889 A1 | 1/2017 | Seki et al. |
| 2017/0343110 A1 | 11/2017 | Seki et al. |
| 2021/0140545 A1 | 5/2021 | Yoshida et al. |

FOREIGN PATENT DOCUMENTS

| | | |
|---|---|---|
| CN | 104620028 A | 5/2015 |
| CN | 104930193 A | 9/2015 |
| CN | 105074298 A | 11/2015 |
| CN | 105308370 A | 2/2016 |
| CN | 110770484 A | 2/2020 |
| DE | 112013004454 T5 | 5/2015 |
| JP | 2-240457 A | 9/1990 |
| JP | H2-240457 A | 9/1990 |
| JP | 2014-55645 A | 3/2014 |
| WO | 2011/105513 A1 | 9/2011 |
| WO | WO 2011/105513 A1 | 9/2011 |
| WO | 2015/111707 A1 | 7/2015 |
| WO | WO 2015/111707 A1 | 7/2015 |

OTHER PUBLICATIONS

Japanese Official Action received in Japan Application No. 2019-570698, dated Mar. 1, 2021 and English language translation.
First Office Action dated Aug. 3, 2021 in corresponding CN application No. 201980006041.2.
First Office Action dated Aug. 10, 2021 in corresponding DE application No. 112019000742.4.
International Search Report issued in International Bureau of WIPO Patent Application No. PCT/JP2019/003000, dated Mar. 5, 2019, and English translation.
Written Opinion issued in International Bureau of WIPO Patent Application No. PCT/JP2019/003000, dated Mar. 5, 2019, and English translation.
ISR for PCT/JP2019/003000, dated Mar. 5, 2019.
Written Opinion for PCT/JP2019/003000, dated Mar. 5, 2019.
Chinese Office Action in CN Application No. 201980006041.2, dated Jan. 6, 2022, along with an English translation thereof.
Office Action Issued in Corresponding CN Patent Application No. 201980006041.2, dated May 26, 2022, along with an English translation thereof.

* cited by examiner

SEAL RING

CROSS REFERENCE TO RELATED APPLICATIONS

The present application is a continuation application of International Patent Application No. PCT/JP2019/003000 filed on Jan. 29, 2019, which claims the benefit of Japanese Patent Application No. 2018-020955, filed on Feb. 8, 2018. The contents of these applications are incorporated herein by reference in their entirety.

BACKGROUND

Technical Field

The present disclosure relates to a seal ring for sealing a space between a shaft and a shaft hole into which this shaft is inserted.

Background

In order to prevent leakage of operation oil used for controlling a hydraulic pressure in an automatic transmission (AT), a continuously variable transmission (CVT), or the like of a vehicle, sealing apparatuses have conventionally been used. Such a sealing apparatus includes a seal ring therein, and the seal ring is used to seal between a shaft and a shaft hole into which the shaft is inserted. Specifically, the seal ring is attached to a groove formed on an outer peripheral surface of a shaft and contacts a side surface of the groove and an inner peripheral surface of a shaft hole, thereby sealing a space between the shaft and the shaft hole and maintaining a hydraulic pressure of operation oil between the shaft and the shaft hole.

As the conventional seal ring mentioned above, there exists a side surface sliding type seal ring which when a shaft is rotationally driven, an outer peripheral surface of the seal ring is pressed against an inner peripheral surface of a shaft hole, the seal ring does not slide against the shaft hole, and a side surface of a groove slides against a side surface of the seal ring. In some side surface sliding type seal ring as mentioned above, in order to reduce a sliding resistance generated between the side surface of the seal ring and the side surface of the groove, for example, by providing recessed parts in a side portion of the seal ring, the side surface of the seal ring is decreased, a contact area with the side surface of the groove of the seal ring is reduced, and a pressing load of the seal ring, which is exerted on the side surface of the groove from the side surface of the seal ring, is reduced (For example, see International Publication No. WO2011/105513 and International Publication No. WO2015/111707).

SUMMARY

In the above-mentioned conventional seal ring, as described above, although the sliding resistance of the seal ring can be reduced, the reduction in the sliding resistance of the seal ring is influenced by a structure of an attachment target. Specifically, the contact area between the side surface of the seal ring and the side surface of the groove of the shaft is increased or decreased, depending on a size of a gap between the shaft and the shaft hole and a shape of the groove. The contact area with the side surface of the groove of the seal ring is decreased, thereby leading to a reduction in sealing performance. Therefore, in the conventional seal ring, there may be a case in which according to the structure of the attachment target, the sealing performance of the seal ring is changed.

The present disclosure is related to provide a seal ring which allows sealing performance of the seal ring not to be changed according to a structure of an attachment target.

In accordance with one aspect of the present disclosure, there is provided a seal ring for sealing an annular gap between a shaft and a shaft hole into which the shaft is inserted. The seal ring is annular around an axis, the seal ring includes an outer peripheral surface facing an outer periphery side and a plurality of recessed parts. The outer peripheral surface is annular around the axis. The plurality of recessed parts are formed in such a way as to be spaced apart from each other in a circumferential direction, and recessed from the outer peripheral surface toward an inner periphery side. Each of the plurality of recessed parts expands, in a direction of the axis, from one side surface to a position which does not reach another side surface. The outer peripheral surface includes a contact surface between the another side surface and the position which does not reach the another side surface, and rib surfaces respectively between mutually neighboring recessed parts in the circumferential direction of the plurality of recessed parts. The contact surface being an annular surface. Each of the rib surfaces is a surface extending between the one side surface and the position which does not reach the another side surface in the direction of the axis.

In the seal ring according to one aspect of the present disclosure, the rib surfaces are arranged at equal intervals in the circumferential direction.

In the seal ring according to one aspect of the present disclosure, each of the recessed parts includes a bottom surface being a surface facing the outer periphery side, and the bottom surface extends from one end of the recessed part in the circumferential direction to another end of the recessed part in the circumferential direction with inclining with respect to the rib surface such that the bottom surface is depressed.

In the seal ring according to one aspect of the present disclosure, the bottom surface is a plane surface.

In the seal ring according to one aspect of the present disclosure, the bottom surface is a curved surface.

In the seal ring according to one aspect of the present disclosure, each of the recessed parts includes a bottom surface being a surface facing the outer periphery side, and the bottom surface is recessed toward the inner periphery side from both ends of the recessed part in the circumferential direction such that the bottom surface is depressed According to a seal ring of the present disclosure, it is possible to allow sealing performance of the seal ring not to be changed according to a structure of an attachment target.

DESCRIPTION OF EMBODIMENTS

Hereinafter, embodiments of the present disclosure will be described with reference to the accompanying drawings.

Figure 1:
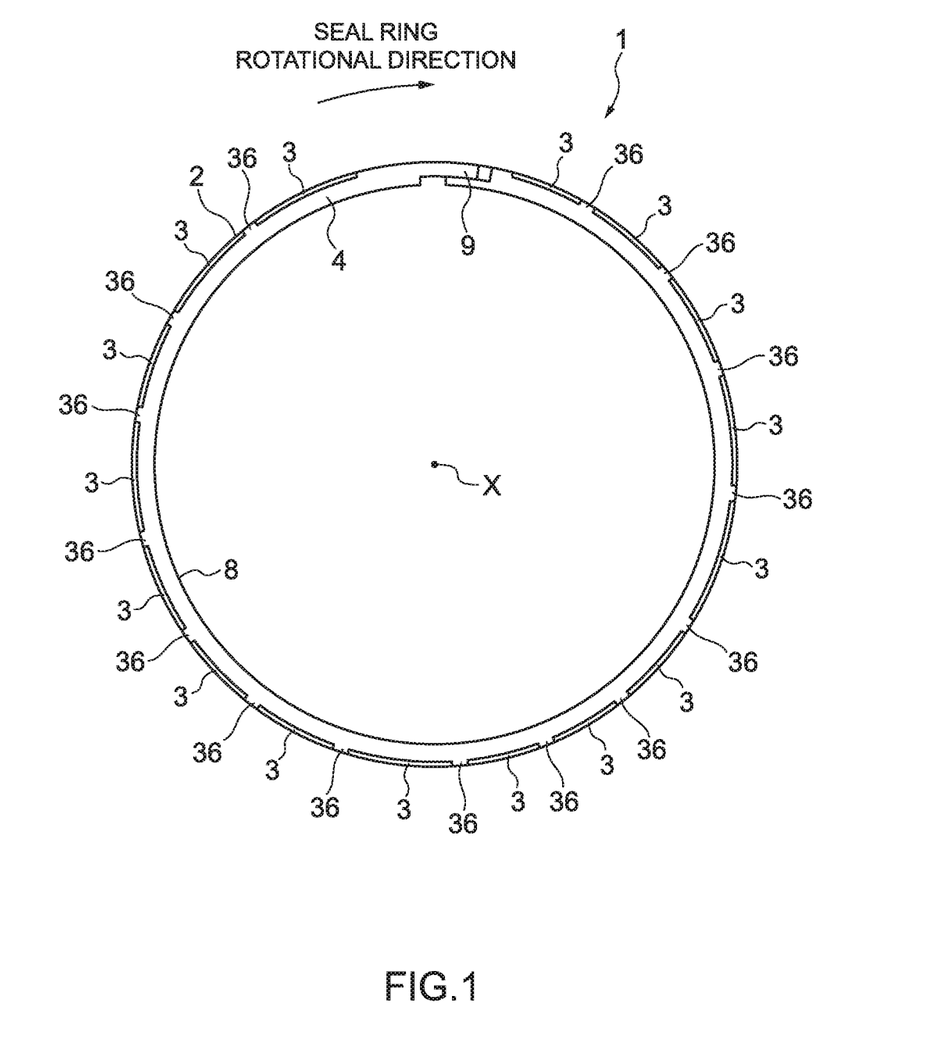
FIG. 1 is a side view of one side, showing a schematic configuration of a seal ring according to a first embodiment of the present disclosure.
Figure 2:
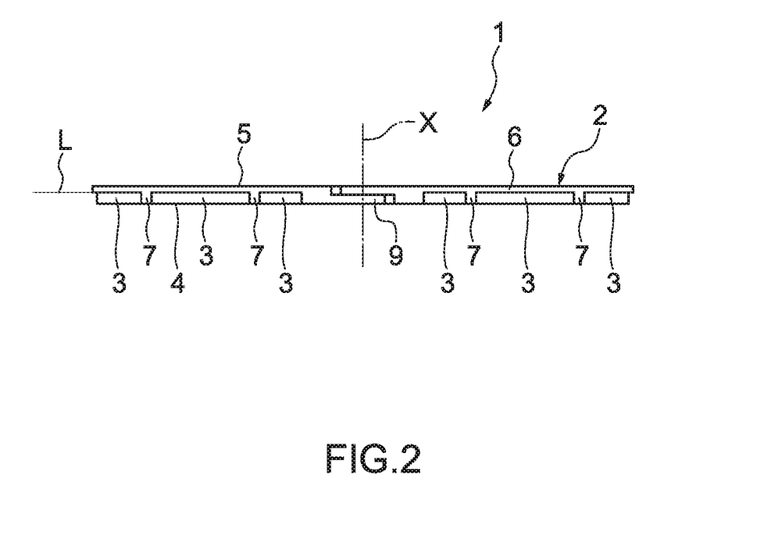
FIG. 2 is a front view showing the schematic configuration of the seal ring according to the first embodiment of the present disclosure.
Figure 3:
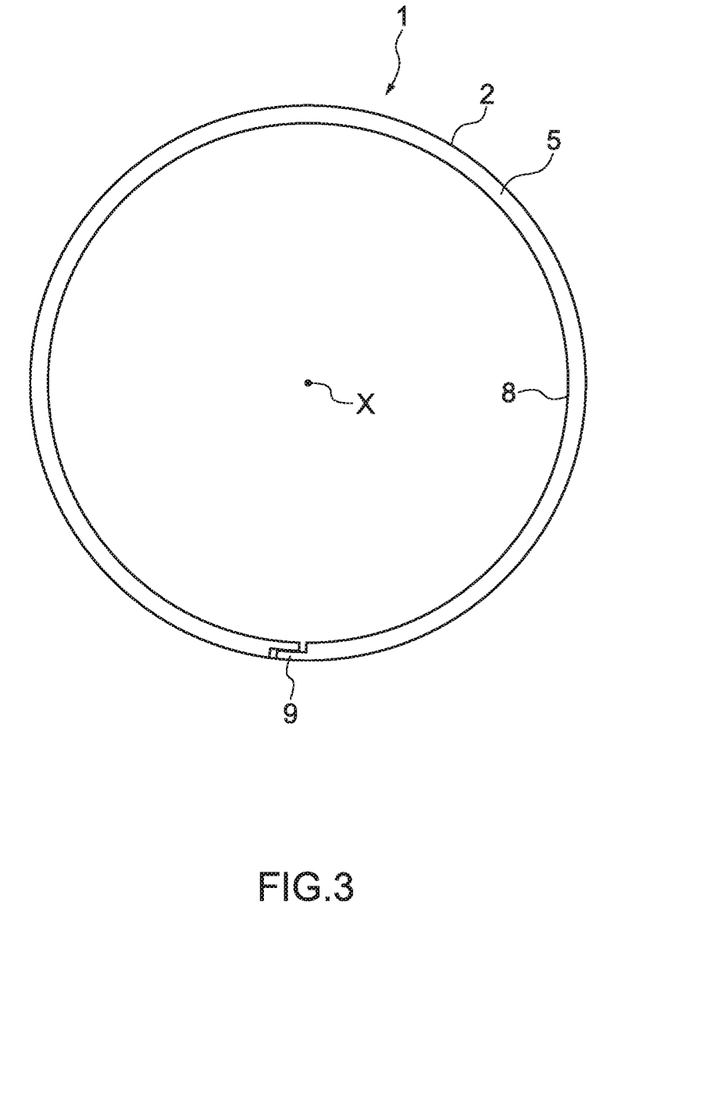
FIG. 3 is a side view of another side, showing the schematic configuration of the seal ring according to the first embodiment of the present disclosure.
Figure 4:
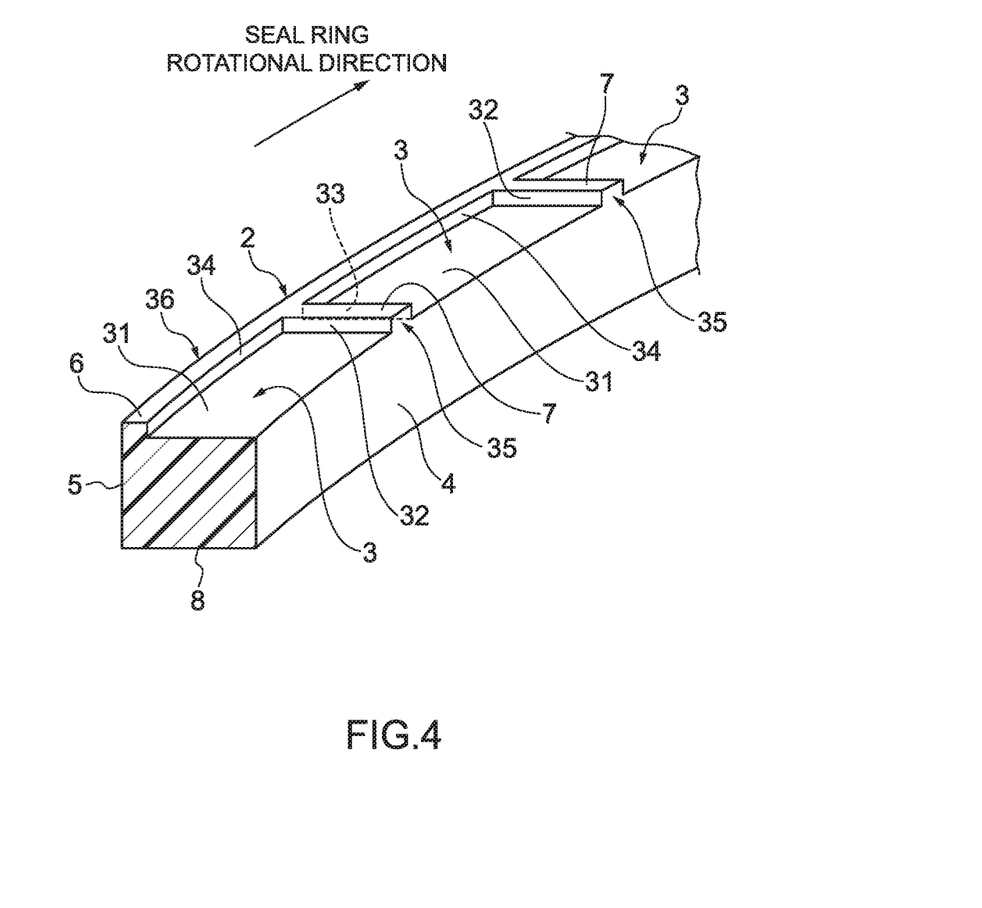
FIG. 4 is a partially enlarged perspective view showing the schematic configuration of the seal ring according to the first embodiment of the present disclosure.

FIG. 1 is a side view of one side, showing a schematic configuration of a seal ring 1 according to a first embodiment of the present disclosure. FIG. 2 is a front view showing the schematic configuration of the seal ring 1. FIG. 3 is a side view of another side, showing the schematic configuration of the seal ring 1. In addition, FIG. 4 is a partially enlarged perspective view showing the schematic configuration of the seal ring 1. The seal ring 1 according to the present embodiment is a sealing apparatus for sealing an annular gap between a shaft and a shaft hole into which this shaft is inserted and is used in a vehicle, a general purpose machine, or the like to seal a space between the shaft and the shaft hole which is formed in a housing or the like and into which this shaft is inserted, the shaft and the housing mutually relatively rotating. The seal ring 1 is used by attaching the seal ring 1 to a groove formed on an outer peripheral surface of a shaft in order to maintain a hydraulic pressure of operation oil in, for example, an automatic transmission or a continuously variable transmission. Note that a target (attachment target) to which the seal ring 1 according to each embodiment of the present disclosure is applied is not limited to the above-mentioned target.

As shown in FIG. 1, the seal ring 1 is annular around an axis x and includes: an outer peripheral surface 2 which faces an outer periphery side and is annular around the axis x; and a plurality of recessed parts 3 which are formed in such a way as to be spaced apart from each other in a circumferential direction and are recessed from the outer peripheral surface 2 toward an inner periphery side. Each of the plurality of recessed parts 3 expands, in an axis x direction, from one side surface 4 to a position which does not reach another side surface 5. The outer peripheral surface 2 includes: a contact surface 6 between the another side surface 5 and the position which does not reach the above-mentioned another side surface 5, the contact surface 6 being an annular surface; and rib surfaces 7, which are surfaces extending between the one side surface 4 and the position which does not reach the above-mentioned another side surface 5 in the axis x direction, respectively between mutually neighboring recessed parts 3 in the circumferential direction of the plurality of recessed parts 3.

Specifically, the outer peripheral surface 2 is a surface facing the outer periphery side and is a surface formed as a sliding surface which is pressed against and slides on an inner peripheral surface of the shaft hole into which the shaft is inserted, in the later-described usage state. The outer peripheral surface 2 extends on a cylindrical or substantially cylindrical surface centered or substantial centered about the axis x. The one side surface 4 is a side surface on a side on which operation oil having a high pressure acts, in the later-described usage state and hereinafter, is also referred to as a high-pressure-side side surface 4. In addition, the another side surface 5 is a side surface on a side on which operation oil having a low pressure acts, in the later-described usage state, is a side surface pressed against a groove side surface of a groove formed in the shaft, and hereinafter, is also referred to as a low-pressure-side side surface 5.

As shown in FIGS. 1 to 3, in the seal ring 1, a cross sectional shape in a surface along the axis x is a rectangular or substantially rectangular shape, and includes the above-mentioned outer peripheral surface 2, high-pressure-side side surface 4 and low-pressure-side side surface 5, and an inner peripheral surface 8 which is a surface facing the inner periphery side. The high-pressure-side side surface 4 and the low-pressure-side side surface 5 are, for example, annular surfaces, each of which expands on a plane or substantially plane surface which is orthogonal or substantially orthogonal to the axis x, and are disposed facing away with each other. In addition, the inner peripheral surface 8 is, for example, a cylindrical or substantially cylindrical surface centered or substantially centered about the axis x and is disposed facing away from the outer peripheral surface 2. Each of the high-pressure-side side surface 4 and the low-pressure-side side surface 5 expands between the outer peripheral surface 2 and the inner peripheral surface 8.

As shown in FIGS. 1 and 2, in a portion on the outer periphery side of the seal ring 1, the plurality of recessed parts 3 which are portions recessed from the outer peripheral surface 2 toward the inner periphery side are formed such that the plurality of recessed parts 3 are arranged in the circumferential direction. The recessed parts 3 are, for example, identical to one another and are formed at equal or substantially equal angular intervals around the axis x. Each of the recessed parts 3 expands, in the axis x direction, from the high-pressure-side side surface 4 to the position (a groove side surface position L (see FIG. 2)) which does not reach the low-pressure-side side surface 5 and which lies within a width of the seal ring 1 in the axis x direction. As shown in FIG. 2, each of the recessed parts 3 is of a rectangular or substantially rectangular shape as viewed from the outer periphery side in a radial direction.

Specifically, as shown in FIG. 4, each of the recessed parts 3 is opened from the high-pressure-side side surface 4 toward a side of the high-pressure-side side surface 4, is opened from the outer peripheral surface 2 to the outer periphery side, and is closed on both ends thereof in the circumferential direction and on an end portion on a side of the low-pressure-side side surface 5. As shown in FIG. 4, each of the recessed parts 3 includes, for example, a bottom surface 31 which is a surface facing the outer periphery side, a front wall surface 32 and a back wall surface 33 which are surfaces extending from both ends of the bottom surface 31 in the circumferential direction toward the outer periphery side, and a side wall surface 34 which is a surface extending from an end of the bottom surface 31 on the side of the low-pressure-side side surface 5 toward the outer periphery side. The bottom surface 31 is a curved surface which expands on a cylindrical or substantially cylindrical surface centered or substantially centered about the axis x. The bottom surface 31 may be a plane surface. Each of the front wall surface 32 and the back wall surface 33 extends on a plane or substantially plane surface, which extends from the axis x in parallel or substantially parallel with the axis x, and extends between the bottom surface 31 and the outer peripheral surface 2 (each rib surface 7). The front wall surface 32 is located on a front side in a rotational direction of the seal ring (seal ring rotational direction (see FIGS. 1 and 4)) in the later-described usage state, and the back wall surface 33 is located on a back side in the seal ring rotational direction. The side wall surface 34 extends on a plane or substantially plane surface, which is orthogonal or substantially orthogonal to the axis x, and extends between the bottom surface 31 and the outer peripheral surface 2 (contact surface 6). As described above, each of the recessed parts 3 is defined by the bottom surface 31, the front wall surface 32, the back wall surface 33, and the side wall surface 34, and inside each of the recessed parts 3, a space having a substantially rectangular plate shape is formed.

In the circumferential direction, respectively between the mutually neighboring recessed parts 3, rib parts 35, which is portions protruding from the bottom surface 31 toward the outer periphery side up to the outer peripheral surface 2 (rib surfaces 7), are formed, and each of the rib parts 35 extends in parallel or substantially parallel with the axis x and is defined by the front wall surface 32 and the back wall surface 33 which are disposed facing away with each other, the rib surface 7, and the high-pressure-side side surface 4. In addition, between the recessed parts 3 and the low-pressure-side side surface 5, a contact projecting part 36, which is an annular portion projecting from the bottom surface 31 toward the outer periphery side up to the outer peripheral surface 2 (contact surface 6), is formed, and the contact projecting part 36 is defined by the low-pressure-side side surface 5, the side wall surfaces 34, and the contact surface 6.

The outer peripheral surface 2 includes the single contact surface 6 and the plurality of rib surfaces 7 as described above. As shown in FIG. 4, specifically, the contact surface 6 is a cylindrical or substantially cylindrical surface which expands between the low-pressure-side side surface 5 and the groove side surface position L in the axis x direction, centered or substantially centered about the axis x. In addition, each of the rib surfaces 7 is a surface having a substantially rectangular shape which extends in parallel or substantially parallel with the axis x on a cylindrical or substantially cylindrical surface centered or substantially centered about the axis x. The outer peripheral surface 2 constitutes the sliding surface which contacts the inner peripheral surface of the shaft hole and slides on this inner peripheral surface, in the later-described usage state. In other words, the contact surface 6 and the rib surfaces 7 constitute the sliding surface in the later-described usage state. It is preferable that a width of the contact surface 6 in the axis x direction is small in order to reduce a sliding resistance applied to the seal ring 1 in the later-described usage state.

The seal ring 1 is formed of a resin material such as polyether ether ketone (PEEK), polyphenylene sulfide (PPS), and polytetrafluoro-ethylene (PTFE). A perimeter of the outer peripheral surface 2 (contact part 6) of the seal ring 1 is shorter than a perimeter of the inner peripheral surface of the shaft hole into which the shaft is inserted, and no interference is provided for the shaft hole. Therefore, in a state in which a fluid pressure does not act on the seal ring 1 in the usage state, the outer peripheral surface 2 of the seal ring 1 comes to be apart from the inner peripheral surface of the shaft hole.

In addition, the seal ring 1 is not endless and as shown in FIGS. 1 to 3, is provided with a joint part 9 at one portion thereof in the circumferential direction. The joint part 9 has a well-known structure capable of maintaining a stable sealing performance even when the perimeter of the seal ring 1 is changed due to thermal expansion or thermal contraction of the seal ring 1. Examples of the structure of the joint part 9 include a so-called special step cut structure which is cut in a stepwise manner as viewed from any of the side of the outer peripheral surface 2 and sides of the both side surfaces 4 and 5, a straight cut structure, a bias cut structure, a step cut structure, or the like. In addition, when as the material of the seal ring 1, a material having low elasticity (PTFE or the like) is employed, no joint part 9 may be provided for the seal ring 1, and the seal ring 1 may be endless.

Subsequently, operation of the seal ring 1 having the above-described configuration will be described.

Figure 5:
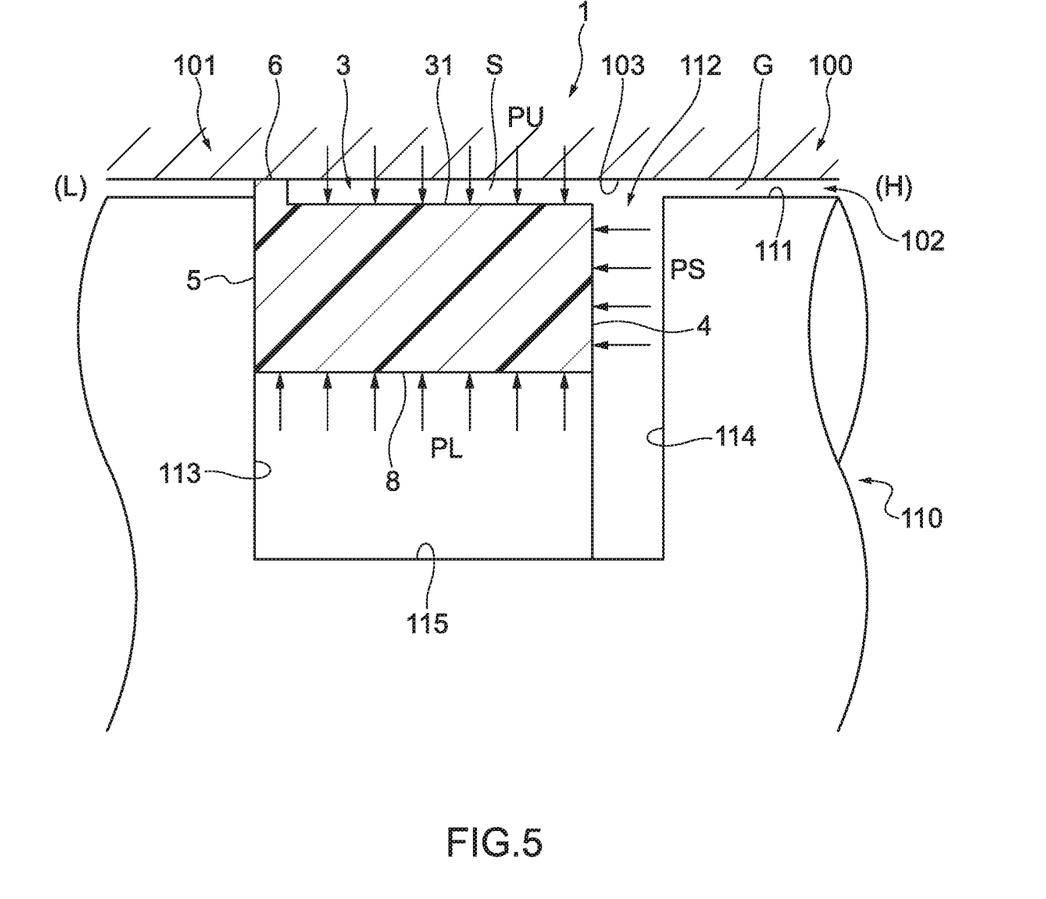
FIG. 5 is a partially enlarged sectional view of the seal ring according to the first embodiment of the present disclosure in an usage state in which the seal ring is attached in a housing of a hydraulic apparatus as an attachment target and to a shaft inserted to a shaft hole which is a through-hole formed in the housing.

FIG. 5 is a partially enlarged sectional view of the seal ring 1 in the usage state in which the seal ring 1 is attached in a housing 101 of a hydraulic apparatus 100 as an attachment target and to a shaft 110 inserted to a shaft hole 102 which is a through-hole formed in the housing 101. The shaft 110 is configured to be relatively rotatable with respect to the housing 101, and in an outer peripheral surface 111 of the shaft 110, an annular groove 112 recessed toward a center side is formed. The groove 112 has a rectangular or substantially rectangular cross sectional shape and is defined by planar side surfaces 113 and 114 and a bottom surface 115. In the hydraulic apparatus 100, an annular space is formed between an inner peripheral surface 103 of the shaft hole 102 and the outer peripheral surface 111 of the shaft 110, and a hydraulic passage which is filled with operation oil, not shown, is formed in the shaft 110 and the housing 101. The seal ring 1 is attached to the groove 112 and seals a gap G between the shaft 110 and the shaft hole 102 in order to prevent a hydraulic pressure of the operation oil inside the hydraulic passage from being lost. In FIG. 5, a right side of the groove 112 constitutes the hydraulic passage, the side surface 113 on a left side of the groove 112 constitutes a contact side surface against which the seal ring 1 is pressed, the right side (H side) of the groove 112 is at a high pressure, and the left side (L side) of the groove 112 is at a low pressure. The seal ring 1 is attached to the groove 112 such that the low-pressure-side side surface 5 faces the contact side surface 113 of the groove 112.

When the operation oil is introduced into the hydraulic passage, the pressure in the hydraulic passage becomes high, whereby the outer peripheral surface 2 and the low-pressure-side side surface 5 of the seal ring 1 are pressed against the inner peripheral surface 103 of the shaft hole 102 and the contact side surface 113 of the groove 112, respectively. Thus, in the annular gap G, the hydraulic passage is sealed, and the hydraulic pressure is maintained. At this time, between each of the recessed parts 3 and the inner peripheral surface 103 of the shaft hole 102, a space S which is opened toward the high pressure side (H) is formed, and the operation oil having the high pressure enters an inside of the space S. As shown in FIG. 5, a force exerted by a pressure of the operation oil at high pressure (arrows PL in FIG. 5) is applied to the inner peripheral surface 8, and a force exerted by a pressure of the operation oil at high pressure (arrows PU in FIG. 5) is applied to the bottom surface 31 of each of the recessed parts 3. Each of the recessed parts 3 extends from the high-pressure-side side surface 4 to the position (groove side surface position L) lying within the width of the seal ring 1, and a large part of the force PL applied to the inner peripheral surface 8 is offset by the force PU applied to the bottom surface 31 of each of the recessed parts 3. Thus, a force exerted by the pressure of the operation oil at high pressure (arrows PS in FIG. 5), which is applied to the high-pressure-side side surface 4 of the seal ring 1, becomes larger than a force (PL−PU) with which the outer peripheral surface 2 (the contact surface 6 and rib surfaces 7) is pressed against the inner peripheral surface 103 of the shaft hole 102. Therefore, when the shaft 110 is rotated, the seal ring 1 is rotated together with the shaft 110, and the outer peripheral surface 2 of the seal ring 1 slides against the inner peripheral surface 103 of the shaft hole 102. In addition, the low-pressure-side side surface 5 of the seal ring 1 remains contacting the contact surface 113 of the groove 112.

As described above, the seal ring 1 allows a contact area with the contact side surface 113 of the groove 112 not to change due to a width of the gap G in the radial direction between the shaft hole 102 and the shaft 110 in the hydraulic apparatus 100 as the attachment target, eccentricity of the shaft 110, or the like, and the outer peripheral surface 2 (the contact surface 6 and the rib surfaces 7) slides against the hydraulic apparatus 100 (the inner peripheral surface 103 of the shaft hole 102) as the attachment target. Therefore, the sealing performance of the seal ring 1 does not change according to the structure of the hydraulic apparatus 100 as the attachment target.

Figure 6:
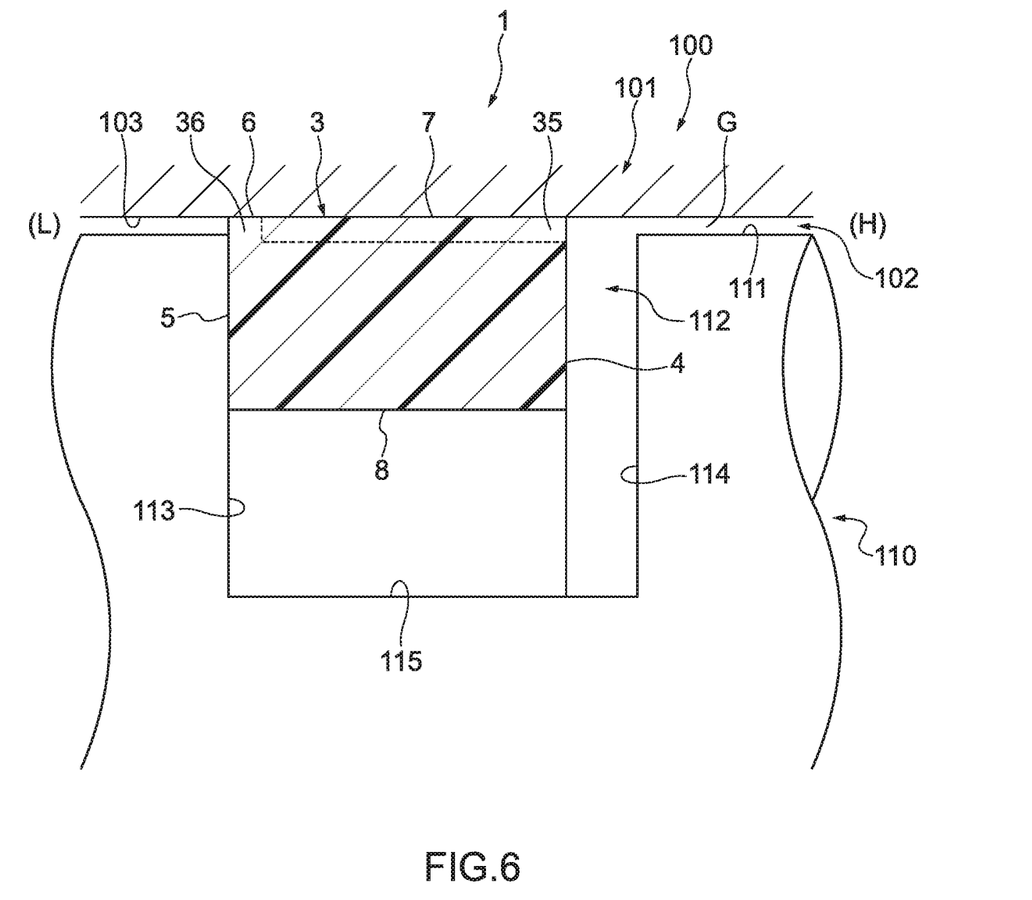
FIG. 6 is a partially enlarged sectional view of the seal ring according to the first embodiment of the present disclosure in another cross section in the usage state in which the seal ring is attached in the housing of the hydraulic apparatus as the attachment target and to the shaft inserted to the shaft hole which is the through-hole formed in the housing.

In addition, as shown in FIG. 6, in the usage state, the seal ring 1 contacts the inner peripheral surface 103 of the shaft hole 102 at the whole between the both side surfaces 4 and 5, in the area where the rib parts 35 are formed. In other words, also in the area where the recessed parts 3 are formed, the rib surfaces 7 of the rib parts 35 contact the inner peripheral surface 103 of the shaft hole 102. Therefore, the contact surface 6 can be prevented from inclining with respect to the inner peripheral surface 103 of the shaft hole 102, and a contacting state of the contact surface 6 with the inner peripheral surface 103 of the shaft hole 102 can be stabilized. In addition, similarly, the low-pressure-side side surface 5 can be prevented from inclining with respect to the side surface 113 of the groove 112, and a contacting state of the low-pressure-side side surface 5 with the side surface 113 of the groove 112 can be stabilized. Thus, the sealing performance of the seal ring 1 can be stabilized. In addition, thus, the width of the contact surface 6 can be made further small while stability of the sealing performance of the seal ring 1 is maintained.

In addition, the area contacting the inner peripheral surface 103 of the shaft hole 102 of the seal ring 1 can be reduced by the recessed parts 3, and the sliding resistance of the shaft hole 102 against the seal ring 1 can be reduced.

In addition, since, as described above, the seal ring 1 allows the sliding resistance of the shaft hole 102 against the seal ring 1 to be reduced, heat generated at the sliding portion in use can be inhibited, and it is possible to use the seal ring 1 under further high PV conditions. In addition, the seal ring 1 can be used also for a soft shaft 110.

As described above, according to the seal ring 1 according to the first embodiment of the present disclosure, it is possible not to change the sealing performance of the seal ring 1 according to the structure of the attachment target.

Figure 7:
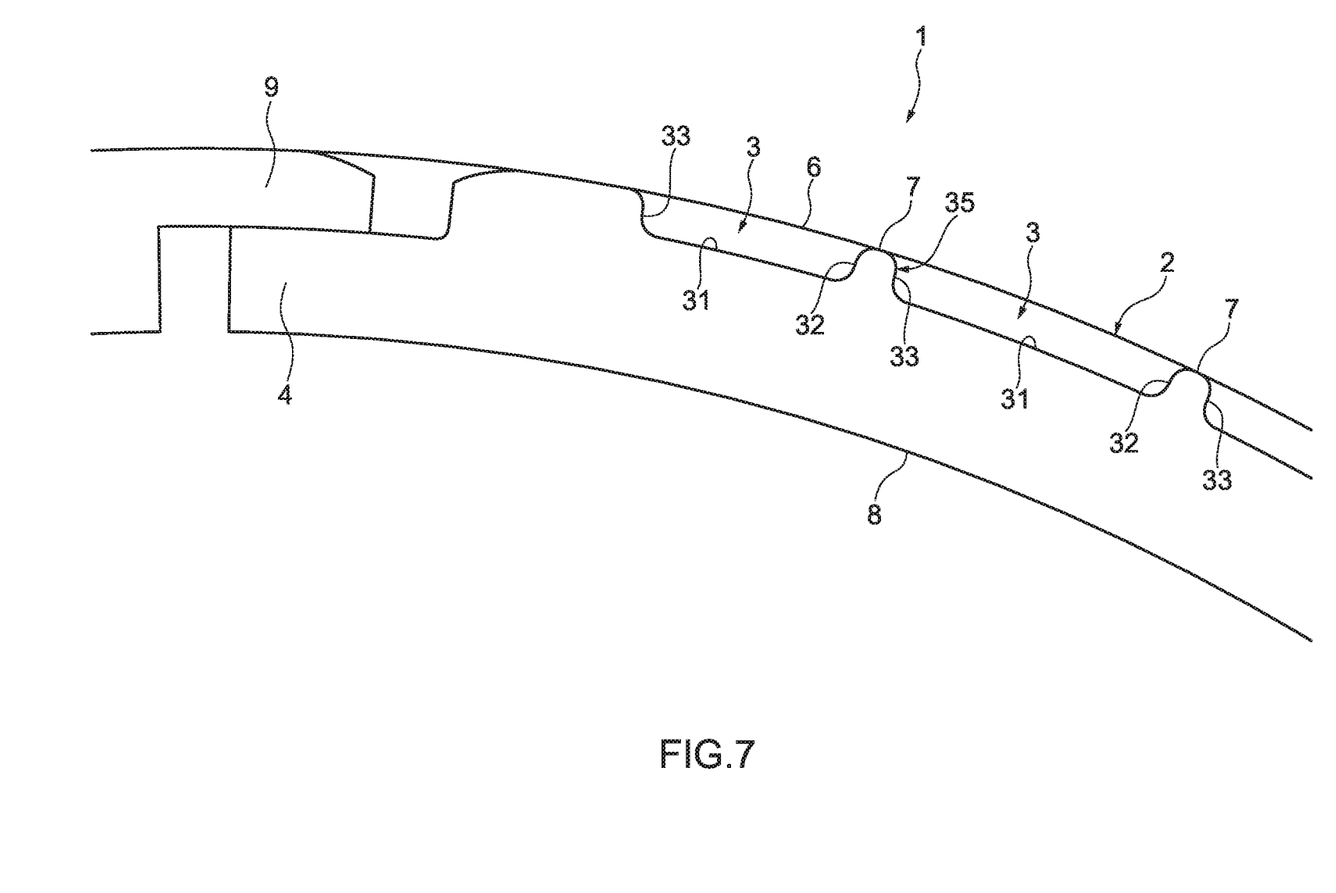
FIG. 7 is an enlarged side view showing a modified example of the rib parts in the seal ring according to the first embodiment of the present disclosure.

As described above, in the usage state, the seal ring 1 rotates together with the shaft 110, the outer peripheral surface 2 slides against the inner peripheral surface 103 of the shaft hole 102, and the recessed parts 3 move along the inner peripheral surface 103 of the shaft hole 102. Therefore, the operation oil entering the inside of each of the recessed parts 3 moves together with the recessed parts 3 along the inner peripheral surface 103 of the shaft hole 102, dynamic pressure effect of the operation oil is brought about by the rib parts 35, and oil films between the rib surfaces 7 and the inner peripheral surface 103 of the shaft hole 102 are formed. Thus, the sliding resistance applied to the seal ring 1 can be reduced. In consideration of the dynamic pressure effect, as the shape of each of the rib parts 35, a shape which is smooth in the rotational direction of the seal ring 1 is preferable. For example, as with a modified example of each of the rib parts 35 shown in FIG. 7, a shape of each of the rib parts 35, which has no corner portion, is employed, thereby allowing a thickness of the film of the operation oil, formed on each of the rib surfaces 7 by the dynamic pressure effect to be increased. Specifically, in each of the rib parts 35 according to the modified example, the bottom surface 31 of the recessed part 3 and the front wall surface 32 are smoothly connected to each other by a curved surface, the front wall surface 32 and the rib surface 7 are smoothly connected to each other by a curved surface, the rib surface 7 and the back wall surface 33 are smoothly connected to each other by a curved surface, and the back wall surface 33 and the bottom surface 31 are smoothly connected to each other by a curved surface. The bottom surface 31, the front wall surface 32, and the back wall surface 33 may be respectively smoothly connected to each other by one or a plurality of plane surfaces obliquely extending, instead of the curved surfaces. Similarly, each of the rib surfaces 7, the front wall surface 32, and the back wall surface 33 may be respectively smoothly connected to each other by one or a plurality of plane surfaces obliquely extending, instead of the curved surfaces.

Figure 8:
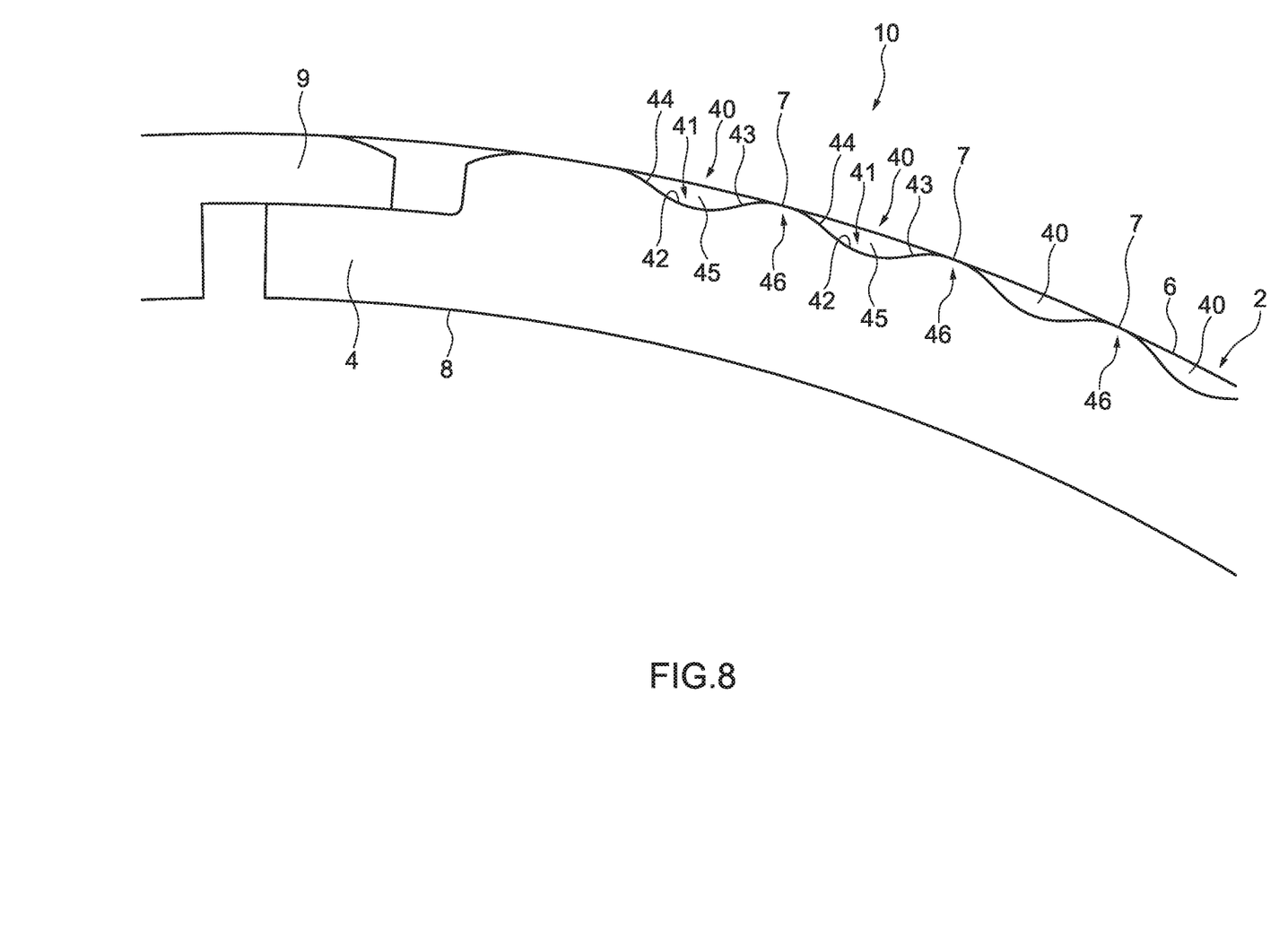
FIG. 8 is a partially enlarged side view illustrating one part of a side surface of one side of a seal ring in an enlarged manner, showing a schematic configuration of the seal ring according to a second embodiment of the present disclosure.

Subsequently, a seal ring 10 according to a second embodiment of the present disclosure will be described. FIG. 8 is a partially enlarged side view illustrating one part of a side surface of one side of the seal ring 10 in an enlarged manner, showing a schematic configuration of the seal ring 10. The seal ring 10 according to the second embodiment of the present disclosure is different from the seal ring 1 according to the first embodiment of the present disclosure in structures of the recessed parts and the rib parts. Hereinafter, components of the seal ring 10 according to the second embodiment of the present disclosure, which are the same as or have similar functions to those of the seal ring 1 according to the first embodiment of the present disclosure, will be denoted by the same reference signs, and the description thereof will be omitted, and different components will be described.

As shown in FIG. 8, as with the recessed parts 3 of the seal ring 1, the seal ring 10 includes a plurality of recessed parts 40 which are formed in such a way as to be arranged in a circumferential direction, and respectively between mutually neighboring recessed parts 40, rib parts 46 having rib surfaces 7 is formed. A bottom surface 41 of each of the recessed parts 40 is recessed toward art inner periphery side in such a way as to be depressed from both ends of the recessed part 40 in a circumferential direction. Specifically, the bottom surface 41 is formed by a bottom part 42, a front wall part 43, and a back wall part 44, the bottom part 42 is a curved surface which is curved in such a way to be convex toward the inner periphery side, and the front wall part 43 and the back wall part 44 are curved surfaces which are curved in such a way to be convex toward the outer periphery side. The front wall part 43 is smoothly connected, at an end portion on the inner periphery side, to the bottom part 42, and the back wall part 44 is smoothly connected, at an end portion on the inner periphery side, to the bottom part 42 on a side opposite to the front wall part 43. As described above, the bottom surface 41 of each of the recessed parts 40 forms the smoothly curved surface and is defined by the front wall part 43, the bottom part 42, and the back wall part 44. In addition, in each of the recessed parts 40, a side wall surface 45 which extends from edges of the front wall part 43, the bottom part 42, and the back wall part 44 on a side of a low-pressure-side side surface 5 to a contact surface 6 and is a plane or substantially plane surface orthogonal or substantially orthogonal to an axis x is formed. An annular contact projection 36 is defined by these side wall surface 45, contact surface 6, and low-pressure-side side surface 5. Each of the rib parts 46 is defined by the front wall part 43 and the back wall part 44 which are disposed facing away from each other in the circumferential direction and the rib surface 7 which extends between the front wall part 43 and the back wall part 44.

As described above, in the seal ring 10 according to the second embodiment of the present disclosure, the bottom surface 41 of each of the recessed parts 40 is smoothly connected to the rib surfaces 7 from the bottom part 42 via the front wall part 43 and the back wall part 44, and dynamic pressure effect of operation oil in the recessed parts 40 can be enhanced. Therefore, in the usage state, a further thick film of the operation oil can be formed between the rib surfaces 7 and the inner peripheral surface 103 of the shaft hole 102, and a sliding resistance applied to the seal ring 10 can be further reduced.

As described above, according to the seal ring 10 according to the second embodiment of the present disclosure, in addition to the operation and effect exhibited by the seal ring 1 according to the first embodiment of the present disclosure, effect to further reduce the sliding resistance applied to the seal ring 10 can be exhibited.

Subsequently, a modified example of the recessed parts 40 of the above-described seal ring 10 will be described.

Figure 9:
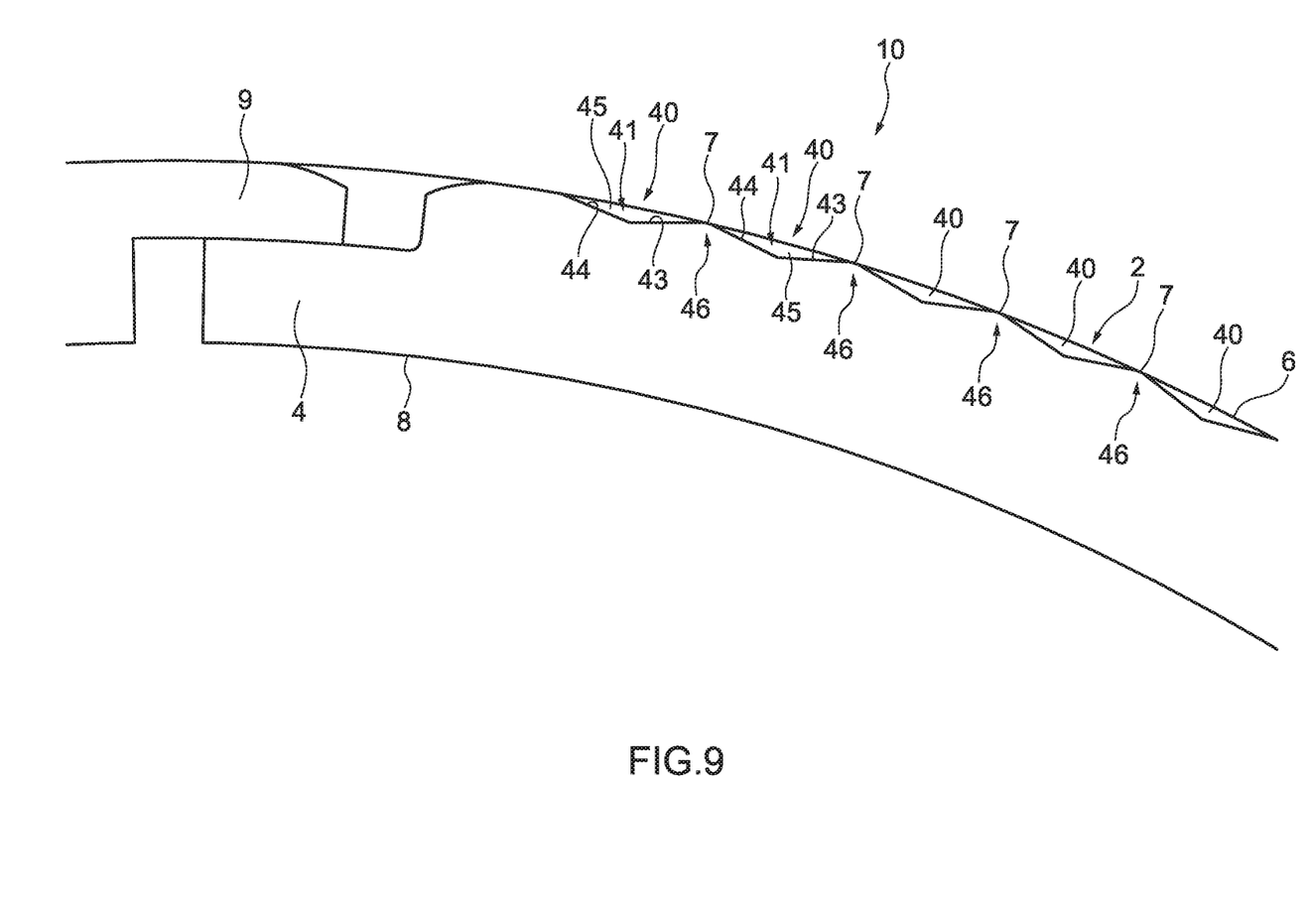
FIG. 9 is a partially enlarged side view of a side surface on one side of the seal ring, showing a first modified example of recessed parts of the seal ring according to the second embodiment of the present disclosure.

FIG. 9 is a partially enlarged side view of the side surface on the one side of the above-described seal ring 10, showing a first modified example of the recessed parts 40 of the seal ring 10. As shown in FIG. 9, in each of the recessed parts 40 according to the first modified example, the bottom surface 41 is recessed toward the inner periphery side in such a way as to be depressed in a V-shaped manner from the both ends of the recessed part 40 in the circumferential direction. Specifically, the bottom surface 41 does not include the bottom part 42 and is formed by a front wall part 43 and a back wall part 44 which define each of the rib parts 46. The front wall part 43 is a plane or substantially plane surface which extends with inclining with respect to the rib surface 7 from one end of the recessed part 40 in the circumferential direction in such a way as to be depressed from the rib surface 7, and the back wall part 44 is a plane or substantially plane surface which extends with inclining with respect to the rib surface 7 from another end of the recessed part 40 in the circumferential direction in such a way as to be depressed from the rib surfaces 7. The front wall part 43 and the back wall part 44 are connected to each other in respective end portions thereof on the inner periphery side.

Figure 10:
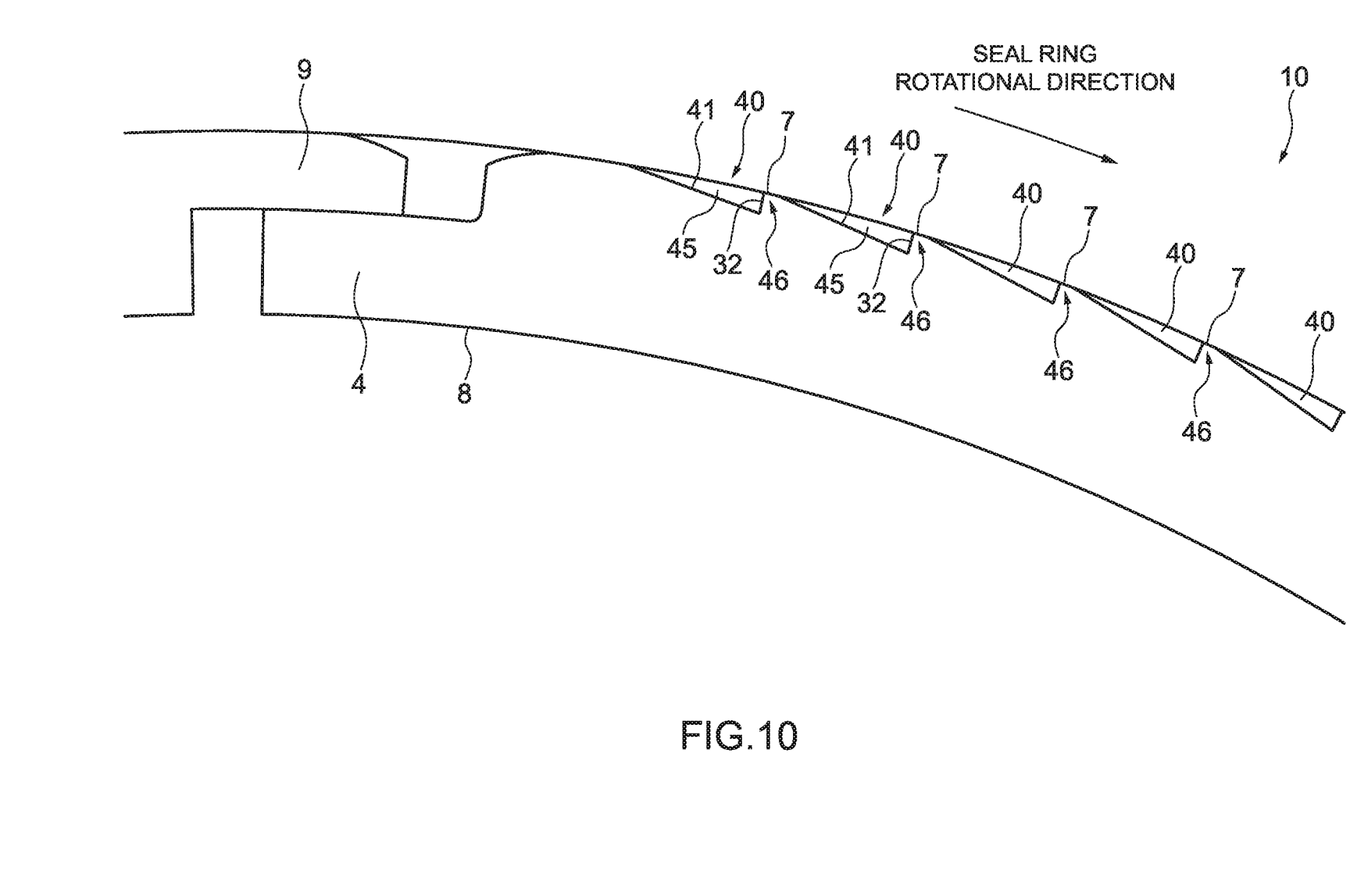
FIG. 10 is a partially enlarged side view of a side surface on one side of the seal ring, showing a second modified example of recessed parts of the seal ring according to the second embodiment of the present disclosure.

FIG. 10 is a partially enlarged side view of the side surface on the one side of the above-described seal ring 10, showing a second modified example of the recessed parts 40 of the seal ring 10. As shown in FIG. 10, each of the recessed parts 40 according to the second modified example extends from one end of the recessed part 40 in the circumferential direction to another end of the recessed part 40 in the circumferential direction with inclining with respect to the rib surface 7 in such a way as to be depressed. Specifically, a bottom surface 41 extends in the circumferential direction from an edge of each rib surface 7 on a front side in the seal ring rotational direction, which is an end of the recessed part 40 on the back side in the seal ring rotational direction, with inclining with respect to the rib surface 7 in such a way as to be depressed. The bottom surface 41 is a plane or substantially plane surface. From the edge of each rib surface 7 on the back side in the seal ring rotational direction, a front wall surface 32, which is a plane or substantially plane surface extending in the radial direction, extends, and in each of the recessed parts 40, the bottom surface 41 extends to the another end of the recessed part 40 in the circumferential direction (an end of the recessed parts 40 on the front side in the seal ring rotational direction) and is connected to the front wall surface 32 here. Each rib part 46 is defined by the bottom surface 41 and the front wall surface 32.

Figure 11:
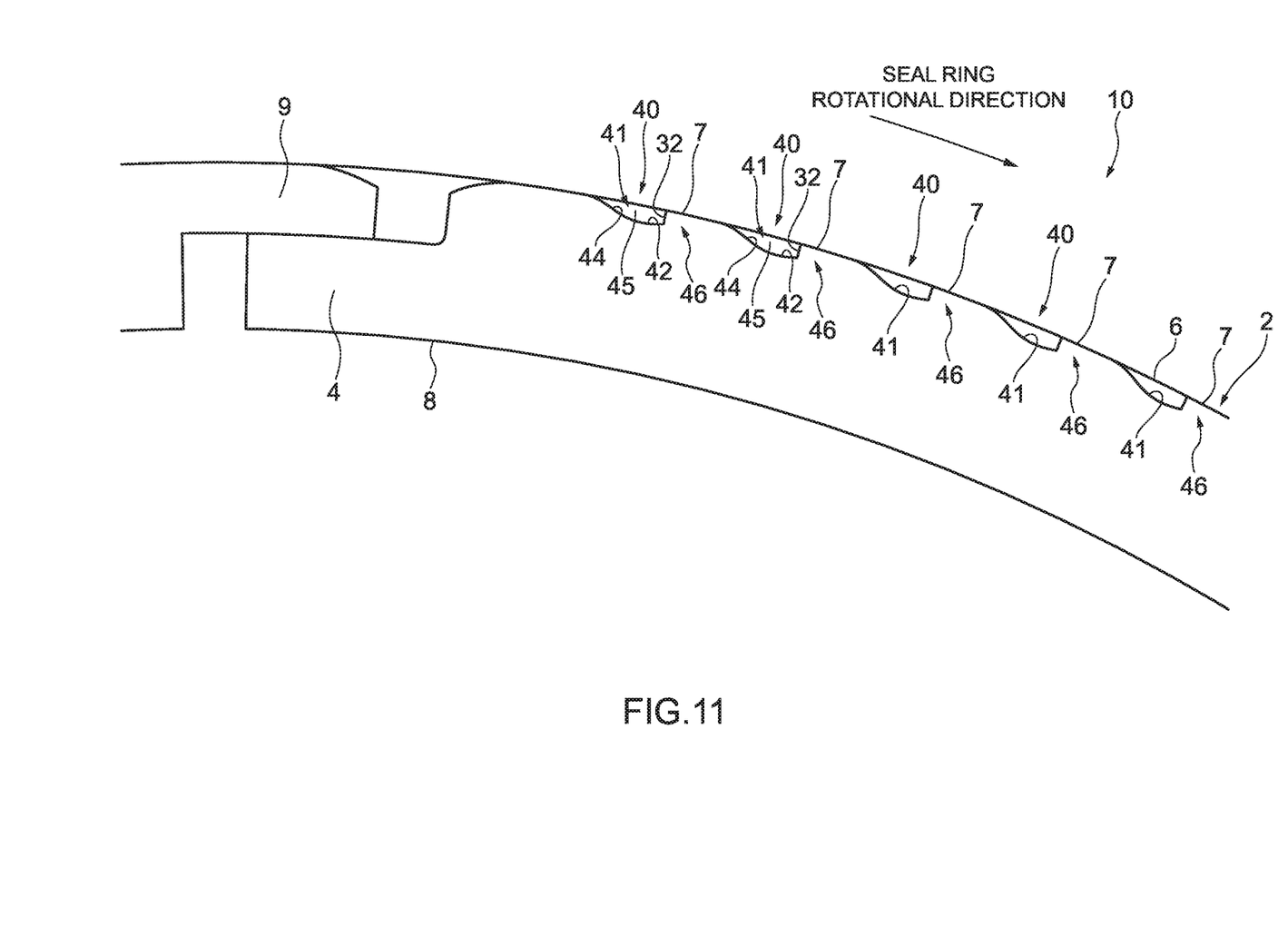
FIG. 11 is a partially enlarged side view of a side surface on one side of the seal ring, showing a third modified example of recessed parts of the seal ring according to the second embodiment of the present disclosure.

FIG. 11 is a partially enlarged side view of the side surface on the one side of the above-described seal ring 10, showing a third modified example of recessed parts 40 of the seal ring 10. As shown in FIG. 11, each of the recessed parts 40 according to the third modified example extends from one end of the recessed part 40 in the circumferential direction to another end of the recessed part 40 in the circumferential direction with inclining with respect to each of the rib surface 7 in such a way as to be depressed. Specifically, a bottom surface 41 extends in the circumferential direction from an edge of each rib surface 7 on the front side in the seal ring rotational direction, which is an end of the recessed part 40 on the back side in the seal ring rotational direction, with inclining with respect to the rib surface 7 in such a way as to be depressed. The bottom surface 41 is a curved surface. From the edge of each rib surface 7 on the back side in the seal ring rotational direction, a front wall surface 32, which is a plane or substantially plane surface extending in the radial direction, extends, and in each of the recessed parts 40, the bottom surface 41 extends to another end of the recessed part 40 in the circumferential direction (an end of the recessed part 40 on the front side in the seal ring rotational direction) and is connected to the front wall surface 32 here. The bottom surface 41 includes a back wall part 44 extending from each rib surface 7 on the back side in the seal ring rotational direction and the bottom part 42 connecting to the back wall part 44 at the front side in the seal ring rotational direction. The bottom part 42 is a curved surface which is curved in such a way as to be convex toward the inner periphery side, and the back wall part 44 is a curved surface which is curved in such a way as to be convex toward the outer periphery side. The back wall part 44 is smoothly connected to the bottom part 42. The bottom part 42 is connected at the front side in the seal ring rotational direction to the front wall surface 32. As described above, the bottom surface 41 of each of the recessed parts 40 forms the smooth curved surface and is defined by the bottom part 42 and the back wall part 44. The bottom part 42 may be recessed toward the inner periphery side further than a portion thereof connected to the front wall surface 32 and may not be recessed toward the inner periphery side further than the portion thereof connected to the front wall surface 32. Each of the rib parts 46 is defined by the front wall surface 32, the rib surface 7, and the back wall part 44. Note that the back wall part 44 may be a plane or substantially plane surface which extends with inclining with respect to the rib surface 7 in such a way as to be depressed from the rib surface 7.

The recessed parts 40 according to the above-described modified examples also operate as with the above-described recessed parts 40 in the seal ring 10 and exhibit effect similar thereto.

Hereinbefore, the preferred embodiments of the present disclosure have been described. However, the present disclosure is not limited to the seal rings 1 and 10 according to the above-described embodiments, and any modes included in the concept of the present disclosure and the scope of the appended claims are embraced. In addition, the respective components may be appropriately selectively combined so as to exhibit at least one part of the above-described problems to be solved and effect. In addition, for example, a shape, a material, arrangement, a size, and the like of each of the components in the above-described embodiments can be appropriately changed according to a specific use mode of the present disclosure.

Each of the rib surfaces 7 is the surface extending on the cylindrical or substantially cylindrical surface (outer peripheral surface 2) as described above. However, the shape of each of the rib surfaces 7 is not limited to this. The shape of each of the rib surfaces 7 may be, for example, a cylindrical or substantially cylindrical surface having a curvature which is different from that of the outer peripheral surface 2, may be other curved surface, or may be a combination of a plane surface and a curved surface. In addition, each of the rib surfaces 7 may form no surface on the outer peripheral surface 2. For example, the front wall surface 32 and the back wall surface 33 may connect to each other on the outer periphery side, and each of the rib surfaces 7 may be formed by a part of the outer periphery side where the front wall surface 32 and the back wall surface 33 connect to each other. Similarly, for example, the front wall part 43 and the back wall part 44 may connect to each other on the outer periphery side, and each of the rib surfaces 7 may be formed by a part of the outer periphery side where the front wall part 43 and the back wall part 44 connect to each other. In addition, similarly, for example, the front wall surface 32 or the back wall surface 33 and the back wall part 44 or the front wall part 43 may connect to each other on the outer periphery side, and each of the rib surfaces 7 may be formed by a part of the outer periphery side where the front wall surface 32 and the back wall part 44 connect to each other or by a part of the outer periphery side where the back wall surface 33 and the front wall part 43 connect to each other.

What is claimed is:

1. A seal ring for sealing an annular gap between a shaft and a shaft hole into which the shaft is inserted, the seal ring being annular around an axis, the seal ring comprising:
   an outer peripheral surface facing an outer periphery side, the outer peripheral surface being annular around the axis; and
   a plurality of recessed parts being formed in such a way as to be spaced apart from each other in a circumferential direction of the seal ring, the plurality of recessed parts being recessed from the outer peripheral surface toward an inner periphery side,
   each of the plurality of recessed parts extends, in a direction of the axis, from one side surface to a position which does not reach another side surface, and
   the outer peripheral surface includes: a contact surface between the another side surface and the position which does not reach the another side surface, the contact surface being an annular surface that extends linearly in a direction parallel to the circumferential direction; and rib surfaces, each of which is a surface extending between the one side surface and the position which does not reach the another side surface in the direction of the axis, respectively between mutually neighboring recessed parts in the circumferential direction,
   wherein each of the plurality of recessed parts includes a bottom surface being a surface facing the outer periphery side,
   wherein the bottom surface extends from one end of a respective one of the plurality of recessed parts in the circumferential direction to another end of the respective one of the plurality of recessed parts in the circumferential direction and from the one side surface to a position which does not reach the another side surface in the direction of the axis while inclining with respect to at least one of the rib surfaces such that the bottom surface is depressed, and
   wherein the bottom surface includes a plurality of planar surfaces, including at least two planar surfaces that are configured to intersect at a depression of the bottom surface and incline towards opposite ends of the respective one of the plurality of recessed parts such that the bottom surface is depressed in a V-shape from both ends of the respective one of the plurality of recessed parts that extends towards the inner peripheral side.

2. The seal ring according to claim 1, wherein the rib surfaces are arranged at equal intervals in the circumferential direction.

3. The seal ring according to claim 1, wherein the recessed parts have a rectangular shape as viewed from the outer peripheral side in a radial direction.

4. The seal ring according to claim 1, wherein the rib surface extends in a direction orthogonal to the direction of the contact surface.

5. A seal ring for sealing an annular gap between a shaft and a shaft hole into which the shaft is inserted, the seal ring being annular around an axis, the seal ring comprising:
   an outer peripheral surface facing an outer periphery side, the outer peripheral surface being annular around the axis; and
   a plurality of recessed parts being formed in such a way as to be spaced apart from each other in a circumferential direction of the seal ring, the plurality of recessed parts being recessed from the outer peripheral surface toward an inner periphery side,
   each of the plurality of recessed parts extends, in a direction of the axis, from one side surface to a position which does not reach another side surface, and
   the outer peripheral surface includes: a contact surface between the another side surface and the position which does not reach the another side surface, the contact surface being an annular surface that extends linearly in a direction parallel to the circumferential direction; and rib surfaces, each of which is a surface extending between the one side surface and the position which does not reach the another side surface in the direction of the axis, respectively between mutually neighboring recessed parts in the circumferential direction, wherein each of the recessed parts includes a bottom surface being a surface facing the outer periphery side, and wherein the bottom surface includes a plurality of planar surfaces, including at least two planar surfaces configured to intersect at a depression of the bottom surface and incline towards opposite ends of the respective one of the plurality of recessed parts such that the bottom surface is depressed in a V-shape from both ends of a respective one of the plurality of recessed parts that extends towards the inner peripheral side.

* * * * *